(12) United States Patent
Jeong

(10) Patent No.: US 11,170,661 B2
(45) Date of Patent: Nov. 9, 2021

(54) PHYSICAL SOFTWARE CODING TRAINING APPARATUS

(71) Applicant: BLUECOMMUNICATION, Seoul (KR)

(72) Inventor: Hee Yong Jeong, Seongnam-si (KR)

(73) Assignee: BLUECOMMUNICATION, Seoul (KR)

( * ) Notice: Subject to any disclaimer, the term of this patent is extended or adjusted under 35 U.S.C. 154(b) by 272 days.

(21) Appl. No.: 16/387,138

(22) Filed: Apr. 17, 2019

(65) Prior Publication Data
US 2019/0318654 A1    Oct. 17, 2019

(30) Foreign Application Priority Data
Apr. 17, 2018 (KR) .................... 10-2018-0044176

(51) Int. Cl.
G09B 19/00 (2006.01)
G06F 8/35 (2018.01)

(52) U.S. Cl.
CPC ............ *G09B 19/0053* (2013.01); *G06F 8/35* (2013.01)

(58) Field of Classification Search
CPC ................ G09B 19/0053; G06F 8/35
See application file for complete search history.

(56) References Cited

U.S. PATENT DOCUMENTS

| | | | |
|---|---|---|---|
| 7,016,949 B1 * | 3/2006 | Tagawa | G09B 19/0053 709/203 |
| 2015/0360366 A1 * | 12/2015 | Gupta | G09B 19/0053 434/118 |
| 2016/0111018 A1 * | 4/2016 | Sousa | G09B 19/0053 434/118 |
| 2017/0103673 A1 * | 4/2017 | Chen | G09B 5/02 |
| 2019/0132399 A1 * | 5/2019 | Henning | H04L 63/10 |

FOREIGN PATENT DOCUMENTS

| | | |
|---|---|---|
| KR | 10-2008-0069721 A | 7/2008 |
| KR | 10-2009-0132091 A | 12/2009 |
| KR | 10-1143137 B1 | 5/2012 |
| KR | 10-2015-0050028 A | 5/2015 |
| KR | 10-1602557 B1 | 3/2016 |
| KR | 10-2017-0043824 A | 4/2017 |

OTHER PUBLICATIONS

Korean Office Action for related KR Application No. 10-2018-0044176 dated Apr. 12, 2019 from Korean Intellectual Property Office.

* cited by examiner

*Primary Examiner* — Peter R Egloff
(74) *Attorney, Agent, or Firm* — Paratus Law Group, PLLC

(57) ABSTRACT

Disclosed is a physical software coding training apparatus. The apparatus includes an interactive content management unit configured to provide interactive content capable of exemplarily representing at least some of a model source code controlling an operation of a physical device connected to a student terminal and overlaying a user input code on the exemplarily represented model source code, a teacher content control unit configured to assign a teacher terminal based on a type of the physical device when the interactive content is executed in the student terminal and to attempt a connection with the teacher terminal, and a student content control unit configured to force the student terminal to write the exemplarily represented model source code without any change when the connection with the teacher terminal fails.

8 Claims, 4 Drawing Sheets

FIG. 5

```
Function A
{
        Source code block 1  ~510
        Source code block 2  ~520
        Source code block 3  ~530
        Source code block 4  ~540
}
```

PHYSICAL SOFTWARE CODING TRAINING APPARATUS

CROSS-REFERENCE TO RELATED APPLICATION

This application is based on and claims priority under 35 U.S.C. 119 to Korean Patent Application No. 10-2018-0044176, filed on Apr. 17, 2018, the contents of which are incorporated by reference herein in their entirety.

BACKGROUND

Field of the Invention

The present invention relates to a physical software coding training technology and, more particularly, to a computer-executable physical software coding training apparatus capable of efficiently performing the training of physical software for a physical device through interactive content.

Discussion of the Related Art

Recently, software coding training is included in the curriculum of an elementary school, and the importance of coding training is highlighted. Software coding training is performed based on a computer, and may be thus grafted onto play and game in order to meet a trainer's eye level unlike the existing training.

Physical computing is one of the core concepts of the computing system area, and is an activity to notify a computer of a value in the real world using a sensor and to produce a program using the value. To deliver a value in the real world to the computer is called a sensor, and to move the value in the real world in response to a command from the computer is called an actuator. In order to use a sensor and an actuator, only a programming language of an expert level could be used. However, a programming language can be used more easily as a sensor capable of being used by anyone is recently developed and supplied.

Korean Patent No. 10-1602557 (Mar. 11, 2016) relates to a method and system for controlling user activity-based media consumption. The user activity-based device consumption control method implemented by a computer includes the steps of storing physical activity information related to a user's motion and controlling whether to control an electronic device or the use time of the electronic device based on the physical activity information.

Korean Patent No. 10-1143137 (May 8, 2012) relates to a wireless device, including a remote station part, such as a cellular phone, a PDA, a laptop computer or a handheld computer, and a detachably connected medical apparatus part, such as a blood sugar monitor. The medical apparatus part is isolated from the remote station part by an isolation circuit and electromagnetic shielding in order to prevent the electronic devices of the remote station part and radio frequency transmission from interfering with a medical device. Furthermore, the control processor of the remote station part includes a battery management unit for disabling functions when the charging of a power source is insufficient to provide sufficient power for an operation of a medical device.

PRIOR ART DOCUMENT

Patent Document

1. Korean Patent No. 10-1602557 (Mar. 11, 2016)
2. Korean Patent No. 10-1143137 (May 8, 2012)

SUMMARY

An embodiment of the present invention proposes a computer-executable physical software coding training apparatus capable of efficiently performing the training of physical software for a physical device through interactive content.

An embodiment of the present invention proposes a computer-executable physical software coding training apparatus, which enables training contents between a teacher and a student to be checked more efficiently through interactive content that exemplarily represents some of a model source code.

An embodiment of the present invention proposes a computer-executable physical software coding training apparatus, which determines the most adequate teacher terminal in a training process through interactive content and connects to a corresponding smartphone when a connection with a corresponding teacher terminal fails so that a student is trained by the most adequate teacher.

In embodiments, a computer-executable physical software coding training apparatus includes an interactive content management unit configured to provide interactive content capable of exemplarily representing at least some of a model source code controlling an operation of a physical device connected to a student terminal and overlaying a user input code on the exemplarily represented model source code, a teacher content control unit configured to assign a teacher terminal based on a type of the physical device when the interactive content is executed in the student terminal and to attempt a connection with the teacher terminal, and a student content control unit configured to force the student terminal to write the exemplarily represented model source code without any change when the connection with the teacher terminal fails.

The interactive content management unit may be configured to dim the exemplarily represented model source code and to wait for the reception of the user input code at the first location of the exemplarily represented model source code.

The interactive content management unit may be configured to determine the range of the dimming based on a coding level of a student.

The teacher content control unit may be configured to attempt a connection with a pre-assigned smartphone of a corresponding teacher when the attempt of the connection fails.

The student content control unit may be configured to allow the student terminal to modify the exemplarily represented model source code when the connection with the teacher terminal is successful and to check the occurrence of the modification and request a training comment from the teacher terminal.

The student content control unit may be configured to receive a verbal explanation of a teacher simultaneously with an amendment of the modified model source code as the training comment.

The student content control unit may be configured to receive adequacy of the modified model source code from the teacher terminal, and to store a modified example of the model source code by associating the modified example with the model source code if the modified model source code is adequate.

The student content control unit may be configured to recommend the modified example of the model source code to the student terminal based on the modification whenever the occurrence of the modification is checked.

BRIEF DESCRIPTION OF THE DRAWINGS

FIG. 5 is a diagram illustrating an example of a model source code on interactive content of FIG. 1.

DESCRIPTION OF REFERENCE NUMERALS

Figure 1:
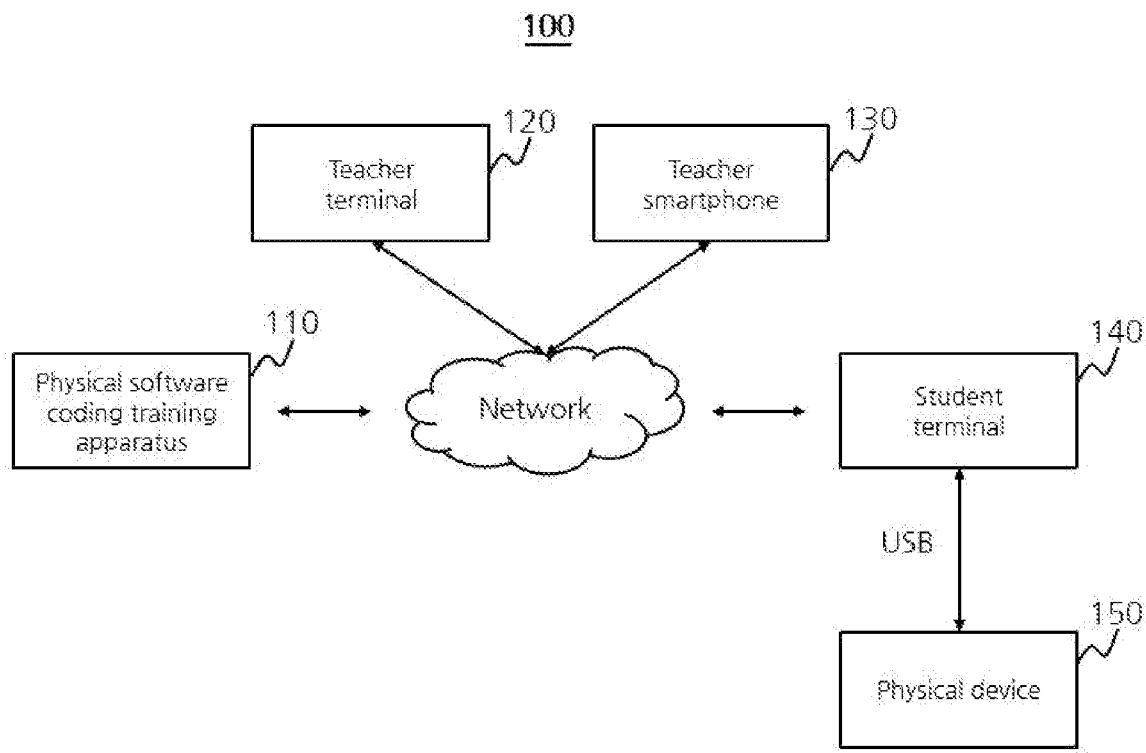
FIG. 1 is a diagram illustrating a physical software coding training system according to an embodiment of the present invention.

100: physical software coding training system
110: physical software coding training apparatus
120: teacher terminal
130: teacher smartphone
140: student terminal
150: physical device
210: interactive content management unit
220: teacher content control unit
230: student content control unit
240: controller

DETAILED DESCRIPTION

A description of the present invention is merely an embodiment for a structural and/or functional description. The range of right of the present invention should not be construed as being limited to embodiments described in the context. That is, the embodiments may be modified in various forms, and the range of right of the present invention should be construed as including equivalents which may realize the technical spirit. Furthermore, the object or effect proposed in the present invention does not mean that a specific embodiment must include all objects or effects or must include only a corresponding effect, and thus the range of right of the present invention should not be understood to be limited thereto.

The meaning of terms described in this application should be construed as follows.

The terms, such as the "first" and the 'second", are used to distinguish one element from the other element, and the range of right of the present invention should not be restricted by the terms. For example, a first element may be named a second element. Likewise, a second element may be named a first element.

When it is said that one element is described as being "connected" to the other element, the one element may be directly connected to the other element, but it should be understood that a third element may be interposed between the two elements. In contrast, when it is described that one element is described as being "directly connected" to the other element, it should be understood that a third element is not interposed between the two elements. Meanwhile, the same principle applies to other expressions, such as "between ~" and "just between ~" or "adjacent to ~" and "adjacent just to ~", which describe a relation between elements.

An expression of the singular number should be understood to include plural expressions, unless clearly expressed otherwise in the context. The terms, such as "include" or "have", should be understood to indicate the existence of a set characteristic, number, step, operation, element, part, or a combination of them and not to exclude the existence of one or more other characteristics, numbers, steps, operations, elements, parts, or a combination of them or a possibility of the addition of them.

In each of steps, symbols (e.g., a, b, and c) are used for convenience of a description, and the symbols do not describe order of the steps. The steps may be performed in order different from order described in the context unless specific order is clearly described in the context. That is, the steps may be performed according to described order, may be performed substantially at the same time, or may be performed in reverse order.

The present inveniton may be implemented in a computer-readable recording medium in the form of computer-readable code. The computer-readable recording medium includes all types of recording devices in which data readable by a computer system is stored. The computer-readable recording medium may include ROM, RAM, CD-ROM, magnetic tapes, floppy disks, and optical data storages, for example. Furthermore, the computer-readable recording medium may be distributed to computer systems connected over a network, and the computer-readable code may be stored and executed in the computer systems in a distributed manner.

All the terms used herein, including technological or scientific terms, have the same meanings as those that are typically understood by those skilled in the art, unless otherwise defined. Terms, such as ones defined in common dictionaries, should be construed as having the same meanings as those in the context of related technology and should not be construed as having ideal or excessively formal meanings, unless clearly defined in the specification.

FIG. 1 is a diagram illustrating a physical software coding training system according to an embodiment of the present invention.

Referring to FIG. 1, the physical software coding training system 100 includes a physical software coding training apparatus 110, a teacher terminal 120, a teacher smartphone 130, a student terminal 140 and a physical device 150, which may be connected over a network.

The physical software coding training apparatus 110 may correspond to a computing device connected to the teacher terminal 120 and the student terminal 140 and capable of performing physical software coding training. The physical software coding training apparatus 110 is described more specifically later with reference to FIG. 2.

The teacher terminal 120 may be managed by a teacher, and may correspond to a computing device capable of training a student through an interaction with the student terminal 140. For example, the teacher terminal 120 may be implemented by a desktop or a notebook and associated with the smartphone 130 of a teacher. The teacher terminal 120 is assigned based on the type of physical device 150, and may provide a verbal explanation to the student terminal 140 when a connection with the student terminal 140 is successful.

The teacher smartphone 130 may be managed by a teacher, and may correspond to a mobile terminal which may be accessorily used when the teacher terminal 120 is not connected. When the teacher terminal 120 is not connected, the teacher smartphone 130 may be previously determined by the previous assignment of a corresponding teacher.

The student terminal 140 may be managed by a student, and may correspond to a computing device which may be trained by a teacher through an interaction with the teacher terminal 120. For example, the student terminal 140 may be implemented by a desktop or a notebook. For another example, the student terminal 140 may be implemented by a smartphone or a tablet personal computer (PC).

The physical device 150 may be connected to the student terminal 140 through a USB, and may perform a specific operation through direct control of the student terminal 140 or indirect control using a program. For example, the physical device 150 may include a robot, an RC vehicle, etc., and may operate through direct or indirect control by the student terminal 140.

Figure 2:
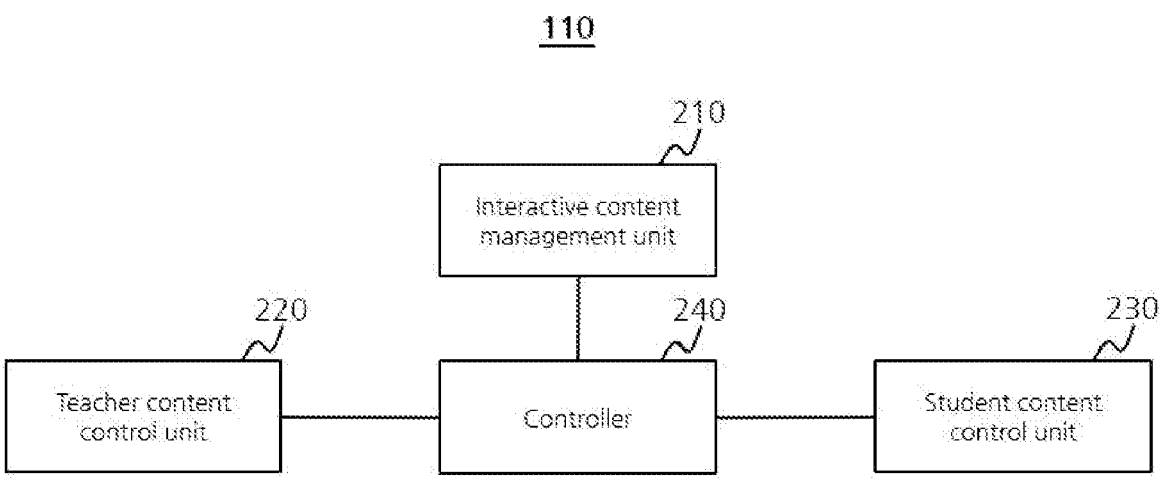
FIG. 2 is a block diagram illustrating a coding training apparatus of FIG. 1.

FIG. 2 is a block diagram illustrating the coding training apparatus of FIG. 1.

Referring to FIG. 2, the physical software coding training apparatus 110 includes an interactive content management unit 210, a teacher content control unit 220, a student content control unit 230 and a controller 240.

The interactive content management unit 210 provides interactive content, which may exemplarily represent at least some of a model source code 500 controlling an operation of the physical device 150 connected to the student terminal 140 and overlay a user input code on the exemplarily represented model source code 500. In this case, the interactive content may include source code training content capable of completing an exemplary representation of the model source code 500 through an interoperation (e.g., at least one of a student's code input behavior and a teacher's code input and verbal explanation behaviors) between the student terminal 140 and the teacher terminal 120.

The interactive content management unit 210 may dim the exemplarily represented model source code 500 of all model source codes 500, and wait for the reception of a user input code at the first location of the exemplarily represented model source code 500. The exemplarily represented model source code 500 is described with reference to FIG. 5.

FIG. 5 is a diagram illustrating an example of the model source code on the interactive content of FIG. 1.

In FIG. 5, the model source code 500 illustrates a programming language for training for control of the physical device 150, and has implemented a function named A.

The model source code 500 sequentially includes first to fourth source code blocks 510~540. The first and second source code blocks 510 and 520 are model codes marked in black, and correspond to code blocks that do not need to be amended by the student terminal 140. The third and fourth source code blocks 530 and 540 are codes that are marked (i.e., dimmed) in gray and exemplarily represented, and correspond to code blocks that require a user code input without any change or a user code input through a modification process by the student terminal 140. In one embodiment, the range of the exemplarily represented model source code 500 dimmed like the third and fourth source code blocks 530 and 540 may be determined based on a coding level of a student.

In one embodiment, the first and second source code blocks 510 and 520 may return to the original state after a lapse of a specific time although the reception of a user code input is rejected or a user code input is received. In another embodiment, the first and second source code blocks 510 and 520 may receive a user code input when a training level assigned to the student terminal 140 is a specific criterion or more, and may be newly changed based on a student's intention.

In one embodiment, the third and fourth source code blocks 530 and 540 allows the reception of a user code input, and may overlay a user code input on a code, marked in gray, in a different color (e.g., blue) when the user code input is identical with the corresponding code. In another embodiment, the third and fourth source code blocks 530 and 540 may store a modified example by associating the modified example with the model source code 500 when a user code input received from the student terminal 140 is received differently from a code marked in gray. The reason for this is that a code modification of another student terminal 140 is checked and a recommendation is provided.

Finally, when the model source code 500 is completed through a user code input, it may control an operation of the physical device 150, such as a robot or an RC vehicle.

Referring back to FIG. 2, the teacher content control unit 220 assigns the teacher terminal 120 based on the type of physical device 150 when interactive content is executed in the student terminal 140. For example, if the type of physical device 150 corresponds to a robot, the teacher content control unit 220 may select the most adequate teacher from a teacher pool including teachers specified for control of the robot, and may search a teacher database (not shown) for the teacher terminal 120 of the corresponding teacher. In one embodiment, the teacher content control unit 220 may preferentially assign a teacher having the highest preference by a student. In another embodiment, the teacher content control unit 220 may preferentially assign a teacher who does not train many students of a specific reference or more.

The teacher content control unit 220 may attempt a connection with the teacher terminal 120 when the teacher terminal 120 is assigned. For example, the teacher content control unit 220 may prompt a message response from a teacher by popping up a lecture connection message on a screen of the teacher terminal 120 using a lecture program installed on the teacher terminal 120. In one embodiment, when a connection with a teacher terminal pre-assigned based on the type of physical device fails until a threshold time calculated according to Equation 1 is exceeded, the teacher content control unit 220 may attempt a repeated connection with the teacher smartphone 130.

$$N = 5 - e^{-(T*S)}, \quad \left(e^{-(T*S)} = 1 + \frac{T}{1!} + \frac{T^2}{2!} + \frac{T^3}{3!} + ...\right), \quad -\infty < T < \infty$$

[Equation 1]

In Equation 1, T corresponds to a threshold time and may be calculated in a time (second) unit. N is the number of repetition connections with the teacher smartphone 130, wherein repetitions (e.g., 5 repetitions) of a specific criterion are a maximum. When a connection with the teacher terminal 120 fails, it corresponds to S=1. When the connection is successful, it corresponds to S=0. N rapidly increases closer to the threshold time.

In one embodiment, the interactive content management unit 210 may determine the range of dimming according to a student coding level through Equation 2.

$$R = k \times \frac{1+G}{2} \quad \text{[Equation 2]}$$

In Equation 2, R corresponds to the range of dimming and uses the number as a range. K corresponds to a proportion coefficient, and G corresponds to a training level. A numerical value of G increases as the training level corresponds to a higher level. The range of dimming having the number that increases depending on a higher training level may be calculated.

When a connection with the teacher terminal 120 pre-assigned based on the type of physical device 150 is successful by the execution of interactive content in the student terminal 140, the student content control unit 230 may allow the student terminal 140 to modify the exemplarily represented model source code 500. When a modification of the model source code 500 occurs, the student content control unit 230 may check the occurrence of the modification and request a training comment from the teacher terminal 120. The student content control unit 230 may perform an amendment, such as determining whether the modified model source code 500 is adequate, as a training comment, and may simultaneously perform a direct comment on the student terminal 140 through a verbal explanation of a corresponding teacher.

In one embodiment, the student content control unit 230 determines whether the model source code 500 modified in the teacher terminal 120 is adequate. If the modified model source code 500 is adequate in relation to the physical device 150 operating by interactive content executed in the student terminal 140, the physical software coding training apparatus 110 stores a modified example of the model source code 500 by associating it with a related model source code 500. Whenever a model source code 500 associated with the occurrence of a modification of such a model source code 500 is checked in the student content control unit 230, the physical software coding training apparatus 110 may recommend a modified example of the model source code 500 to the student terminal 140 so that the student terminal 140 can use the modified example to control an operation of the physical device 150.

Figure 3:
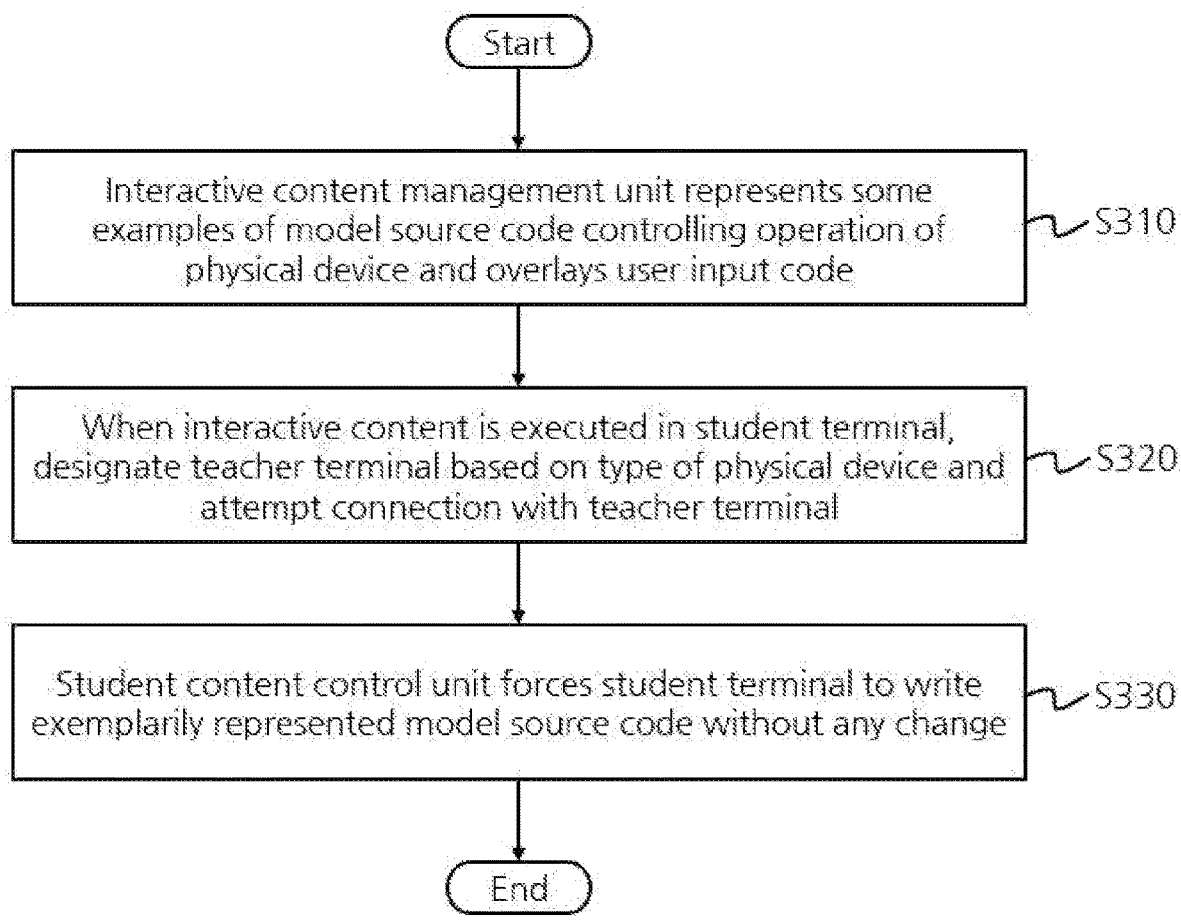
FIG. 3 is a flowchart illustrating a physical software coding training process performed in the coding training apparatus of FIG. 1.

FIG. 3 is a flowchart illustrating a physical software coding training process performed in the coding training apparatus of FIG. 1.

Referring to FIG. 3, the physical software coding training apparatus 110 enables the interactive content management unit 210 to represent some examples of the model source code 500, controlling an operation of the physical device 150, in the student terminal 140 so that a student can overlay an input code (step S310).

When interactive content is executed in the student terminal 140, the teacher content control unit 220 may attempt a connection with the teacher terminal 120 pre-assigned based on the type of physical device 150 (step S320).

When the connection with the teacher terminal 120 according to the type of physical device 150 fails, the student content control unit 230 may force the student terminal 140 to write an exemplarily represented model source code 500 without any change (step S330).

Figure 4:
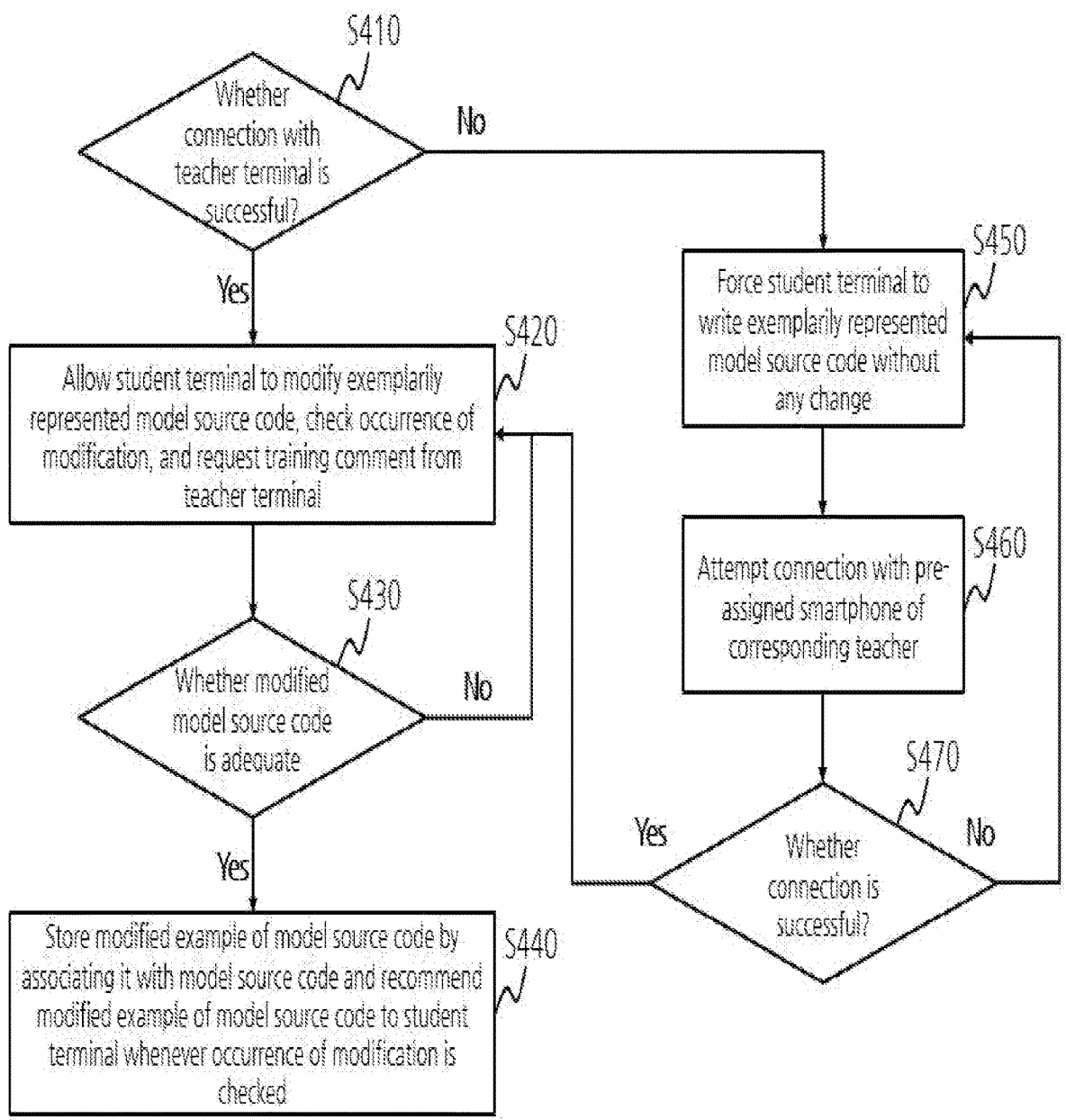
FIG. 4 is a flowchart illustrating a connection process with a teacher terminal assigned based on the type of physical device in a teacher content control unit during a physical software coding training process of FIG. 1.

FIG. 4 is a flowchart illustrating a connection process with a teacher terminal assigned based on the type of physical device in the teacher content control unit during a physical software coding training process of FIG. 1.

Referring to FIG. 4, when interactive content is executed in the student terminal 140, the physical software coding training apparatus 110 attempts a connection with the teacher terminal 120 pre-assigned based on the type of physical device 150 (step S410).

When the attempt of the connection with the teacher terminal 140 is successful, the student content control unit 230 allows the student terminal 140 to modify the exemplarily represented model source code 500. The student content control unit 230 checks the occurrence of the modification in the model source code 500 so that the student terminal 140 can request a training comment from the teacher terminal 120 (step S420).

The student content control unit 230 determines whether the modified model source code 500 is adequate (step S430). If a modified example of the model source code 500 is adequate, the student content control unit 230 stores the modified example of the model source code 500 by associating it with a model source code 500. Whenever the occurrence of a modification in a related model source code 500 is checked by the execution of interactive content in the student terminal 140, the student content control unit 230 recommends a modified example of the model source code 500 to the student terminal 140 (step S440). If a modification of the model source code 500 is not adequate, the student content control unit 230 enables the student terminal 140 to request a training comment from the teacher terminal 120 (step S420).

When the attempt of the connection with the teacher terminal 120 fails, the student content control unit 230 may force the student terminal 140 to write the exemplarily represented model source code 500 without any change (step S450).

Furthermore, when the attempt of the connection with the teacher terminal 120 fails, the teacher content control unit 220 may attempt a connection with a pre-assigned smartphone of a corresponding teacher 130 (step S460). In such a case, the teacher content control unit 220 determines whether the connection with the pre-assigned smartphone 130 of the teacher is successful (step S470). When the connection is successful, the student content control unit 230 may allow the student terminal 140 to modify the exemplarily represented model source code 500, may check the occurrence of a modification in the model source code 500, and may enable the student terminal 140 to request a training comment from the teacher terminal 120 (step S420). When the connection with the teacher terminal 120 fails, the student content control unit 230 may force the student terminal 140 to write the exemplarily represented model source code 500 without any change (step S450).

The disclosed technology may have the following effects. However, this does not mean that a specific embodiment must include all the following effects or must include only the following effects. Accordingly, the range of right of the disclosed technology should not be understood as being limited thereto.

An embodiment of the present invention can provide the computer-executable physical software coding training apparatus, which enables training contents between a teacher and a student to be checked more efficiently through interactive content that exemplarily represents some of a model source code.

An embodiment of the present invention can provide the computer-executable physical software coding training apparatus, which determines the most adequate teacher terminal in a training process through interactive content and connects to a corresponding smartphone when a connection with a corresponding teacher terminal fails so that a student can be trained by the most adequate teacher.

Although some embodiments of the present invention have been described above, those skilled in the art will appreciate that the present invention may be modified and changed in various ways without departing from the technical spirit and scope of the present invention written in the appended claims.

What is claimed is:

1. A computer-executable physical software coding training apparatus, comprising:

an interactive content management unit configured to provide interactive content capable of exemplarily representing at least some of a model source code controlling an operation of a physical device connected to a student terminal and overlaying a user input code on the exemplarily represented model source code;

a teacher content control unit configured to assign a teacher terminal based on a type of the physical device when the interactive content is executed in the student terminal and to attempt a connection with the teacher terminal; and a student content control unit configured to force the student terminal to write the exemplarily represented model source code without any change when the connection with the teacher terminal fails, wherein the interactive content management unit, the teacher content control unit, and the student content control unit are each implemented via at least one processor.

2. The apparatus of claim 1, wherein the interactive content management unit is further configured to:

dim the exemplarily represented model source code; and wait for a reception of the user input code at a first location of the exemplarily represented model source code.

3. The apparatus of claim 2, wherein the interactive content management unit is further configured to determine a range of the dimming based on a coding level of a student.

4. The apparatus of claim 1, wherein the teacher content control unit is further configured to attempt a connection with a pre-assigned smartphone of a corresponding teacher when the attempt of the connection fails.

5. The apparatus of claim 1, wherein the student content control unit is further configured to:

allow the student terminal to modify the exemplarily represented model source code when the connection with the teacher terminal is successful; and check an occurrence of the modification and request a training comment from the teacher terminal.

6. The apparatus of claim 5, wherein the student content control unit is further configured to receive a verbal explanation of a teacher simultaneously with an amendment of the modified model source code as the training comment.

7. The apparatus of claim 5, wherein the student content control unit is further configured to:

receive adequacy of the modified model source code from the teacher terminal; and store a modified example of the model source code by associating the modified example with the model source code if the modified model source code is adequate.

8. The apparatus of claim 7, wherein the student content control unit is further configured to recommend the modified example of the model source code to the student terminal based on the modification whenever the occurrence of the modification is checked.

* * * * *